United States Patent
Kim et al.

(10) Patent No.: US 12,112,468 B2
(45) Date of Patent: Oct. 8, 2024

(54) METHOD AND APPARATUS FOR DETECTING DIMENSION ERROR

(71) Applicant: Electronics and Telecommunications Research Institute, Daejeon (KR)

(72) Inventors: Hye-Jin Kim, Daejeon (KR); Suyoung Chi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 795 days.

(21) Appl. No.: 17/163,051

(22) Filed: Jan. 29, 2021

(65) Prior Publication Data

US 2021/0241450 A1    Aug. 5, 2021

(30) Foreign Application Priority Data

Jan. 30, 2020 (KR) .................. 10-2020-0010952
Oct. 19, 2020 (KR) .................. 10-2020-0135260
Jan. 22, 2021 (KR) .................. 10-2021-0009059

(51) Int. Cl.
*G06K 9/00* (2022.01)
*G06N 20/00* (2019.01)
*G06T 7/00* (2017.01)
*G06T 7/50* (2017.01)

(52) U.S. Cl.
CPC .......... *G06T 7/0006* (2013.01); *G06N 20/00* (2019.01); *G06T 7/50* (2017.01); *G06T 2207/20081* (2013.01); *G06T 2207/30108* (2013.01)

(58) Field of Classification Search
CPC ............. G06T 7/50; G06T 2207/30108; G06T 2207/20081; G06T 7/0004; G06T 7/174; G06T 7/001; G06N 20/00; G06N 3/08
See application file for complete search history.

(56) References Cited

U.S. PATENT DOCUMENTS

| 9,575,172 | B2 | 2/2017 | Charpentier et al. |
| 10,008,005 | B2 * | 6/2018 | Lai .......... H04N 23/60 |
| 10,043,285 | B2 | 8/2018 | Kim |
| 10,582,089 | B2 | 3/2020 | Novikov et al. |

(Continued)

FOREIGN PATENT DOCUMENTS

| CN | 107204010 B | 11/2019 |
| JP | 6579353 B1 | 9/2019 |

(Continued)

OTHER PUBLICATIONS

Hye-Jin S. Kim et al., Magnifer Network for Ceramic Z-directional Height Estimation with a Single Image, 2020 International Conference on Information and Communication Technology Convergence (ICTC), Institute of Electrical and Electronics Engineers, Oct. 21-23, 2020.

*Primary Examiner* — Andrew M Moyer
*Assistant Examiner* — Aidan Keup
(74) *Attorney, Agent, or Firm* — William Park & Associates Ltd.

(57) ABSTRACT

An apparatus for detecting a dimension error obtains an image of a target object, estimates dimensional data for a region of interest (ROI) for which dimensions are to be measured from the image of the target object using a learned dimensional measurement model, and determines whether there is a dimension error in the ROI from the estimated dimension data using a learned dimension error determination model.

12 Claims, 20 Drawing Sheets

(56) References Cited

U.S. PATENT DOCUMENTS

| | | | |
|---|---|---|---|
| 11,830,174 B2 * | 11/2023 | Ikeda | ..................... G01N 21/88 |
| 2016/0178746 A1 | 6/2016 | Charpentier et al. | |
| 2019/0156552 A1 | 5/2019 | Han et al. | |
| 2019/0213481 A1 | 7/2019 | Godard et al. | |

FOREIGN PATENT DOCUMENTS

| | | | |
|---|---|---|---|
| KR | 20000058836 A | 10/2000 | |
| KR | 1020190056322 A | 5/2019 | |
| KR | 20190065287 A | 6/2019 | |
| KR | 102003952 B1 | 7/2019 | |
| KR | 102019978 B1 | 9/2019 | |
| KR | 102024151 B1 | 9/2019 | |

* cited by examiner

METHOD AND APPARATUS FOR DETECTING DIMENSION ERROR

CROSS-REFERENCE TO RELATED APPLICATION

This application claims priority to and the benefit of Korean Patent Application Nos. 10-2020-0010952, 10-2020-0135260, and 10-2021-0009059 filed in the Korean Intellectual Property Office on Jan. 30, 2020, Oct. 19, 2020, and Jan. 22, 2021, respectively, the entire contents of which are incorporated herein by reference.

BACKGROUND OF THE INVENTION

(a) Field of the Invention

The present invention relates to a method and apparatus for detecting a dimension error. More specifically, the present invention relates to a method and apparatus for detecting a dimension error that is capable of determining whether an object has a dimension error based on artificial intelligence technology with respect to an image captured by a capturing device mounted on a mechanism such as a robot arm or a conveyor.

(b) Description of the Related Art

In a manufacturing industry such as ceramics, when dimensions of a produced product are wrong, a technology that can detect whether there is a dimension error is required.

Methods for detecting a dimension error can be divided into a method using a physical sensor and a method of analyzing images captured by a camera. In case of the method of using the physical sensor, related sensors are commercialized, but the physical sensor has a limitation for detecting a dimension error. The method of analyzing images can measure the dimensions of several objects using a single camera, but there is a problem that it is difficult to widely apply it since a system composed of expensive cameras and lighting equipment is required.

Meanwhile, methods for detecting a dimension error from captured images are mainly used to set a location to measure the dimensions of a nearby object and show the dimensions of that location. Such dimensional measurement enables high-precision dimensional measurement only when expensive sensors and lighting equipment are installed. Furthermore, it does not detect whether the dimensional result indicates a dimension error product, but requires user intervention to determine the dimensional error.

SUMMARY OF THE INVENTION

The present invention has been made in an effort to provide a method and apparatus for detecting a dimension error that is capable of determining whether an object has a dimension error without user intervention and expensive devices.

According to an embodiment of the present invention, a method for detecting a dimension error of a target object in an apparatus for detecting a dimensional error is provided. The method for detecting a dimension error includes: obtaining an image of the target object; estimating dimensional data for a region of interest (ROI) for which dimensions are to be measured from the image of the target object using a learned dimensional measurement model; and determining whether there is a dimension error in the ROI from the estimated dimension data using a learned dimension error determination model.

The method for detecting a dimension error may further include learning the dimension measurement model using learning data including an image of each object and ground truth (GT) dimension data of each object, wherein the learning may include: converting the estimated dimension data of the dimension measurement model to the image of each object and the GT dimension data corresponding to the image of each object by using an objective function that converts data values within a set target value range, respectively; calculating differences between the estimated dimension data and the ground truth dimension data converted, respectively, by the objective function; and updating weights set in the dimension measurement model based on the differences.

The learning may further include: classifying the estimated dimension data of the dimension measurement model into data corresponding to the range of the target value and data outside the range of the target value; substituting the data within the range of the target value and ground truth (GT) data as an input value of the objective function, respectively; and in the case of data outside the range of the target value, calculating a difference between the data outside the range of the target value and the corresponding dimension data without conversion using the target function.

The objective function may include a function of Equation 1, wherein Equation 1 is $Z=\log(c1+1-x)$, and the $c1$ is the target value, while $x$ is the estimated dimension data or the GT dimension data.

The objective function may include a function of Equation 2, wherein Equation 2 is $z=\log(abs(\log(c1+1-x)))$, and the $c1$ is the target value, while $x$ is the estimated dimension data or the GT dimension data.

The method for detecting a dimension error may further include: learning the dimension measurement model using first learning data including an image of each object and GT dimension data of each object; and learning the dimension error determination model using second learning data including the image of each object, the estimated dimension data of the dimension measurement model for the image of each object, and information necessary for determining the dimension error of each object.

The information necessary for determining the dimension error may include at least one of information on objects with a dimensional error, information on objects without a dimensional error, a shape of the region of interest, and a position of the ROI.

According to another embodiment of the present invention, a method for detecting a dimension error of a target object in an apparatus for detecting a dimensional error is provided. The method for detecting a dimension error includes: obtaining a two-dimensional (2D) image of the target object; generating a depth image from the 2D image of the target object through a learned depth estimation model; and determining whether or not there is a dimension error in the region of interest (ROI) to be measured in the target object from the 2D image and the depth image using a learned dimension error determination model.

The method for detecting a dimension error may further include: obtaining a 3D image of the target object; and determining whether or not there is a dimension error in the ROI from the 3D image using the learned dimension error determination model.

The method for detecting a dimension error may further include learning the dimension error determination model using at least one 2D image of at least one object, a depth image generated from each 2D image, at least one 3D image of at least one object, and information necessary to determine the dimension error of each object.

The information necessary for determining the dimension error may include at least one of information on objects with a dimensional error, information on objects without a dimensional error, a shape of the region of interest, and a position of the ROI.

The learning may include generating the depth image from the at least one 2D image through a learned depth estimation model.

According to another embodiment of the present invention, an apparatus for detecting a dimension error of a target object is provided. The apparatus for detecting a dimension error includes: an image capturing unit that acquires an image of the target object; and a dimension error analyzer that determines whether or not there is a dimension error in the region of interest for which dimensions are to be measured from the image of the target object using a learned dimension error determination model.

The apparatus for detecting a dimension error may further include a three-dimensional (3D) image acquirer that estimates dimension data for the ROI from the image of the target object using a learned dimension measurement model, wherein the dimension error determination model may receive dimensional data estimated by the dimensional measurement model as an input and may detect whether the dimension error has occurred.

The 3D image acquirer includes a dimensional measurement model learning unit that learns the dimension measurement model using learning data including an image of each object and ground truth (GT) dimension data of each object, and the dimension measurement model learning unit may include: a data converter that converts the estimated dimension data of the dimension measurement model to the image of each object and the GT dimension data corresponding to the image of each object by using an objective function that converts data values within a set target value range, respectively; and a weight updater that updates weights set in the dimension measurement model based on differences between the estimated dimension data and the ground truth dimension data converted, respectively, by the objective function.

The apparatus for detecting a dimension error may further include, when a 2D image of the target object is acquired from the image capturing unit, a three-dimensional (3D) image acquirer that generates a depth image including distance information between the image capturing unit and the target object from the 2D image, and the dimension error analyzer may determine whether the dimension error has occurred from the 2D image and the depth image of the target object using the dimension error determination model.

The dimension error analyzer may include a dimension error determination model learning unit that learns a dimension error determination model using a 2D image of each object, a depth image generated from each 2D image, a 3D image of each object, dimension data corresponding to the 2D image for each object, and information necessary to determine the dimension error of each object.

The 3D image acquirer may generate the depth image from the 2D image of the target object through a learned depth estimation model.

The 3D image acquirer may learn the depth estimation model using the 2D image of each object and a depth image including corresponding distance information of each 2D image.

DETAILED DESCRIPTION OF THE EMBODIMENTS

Figure 1:
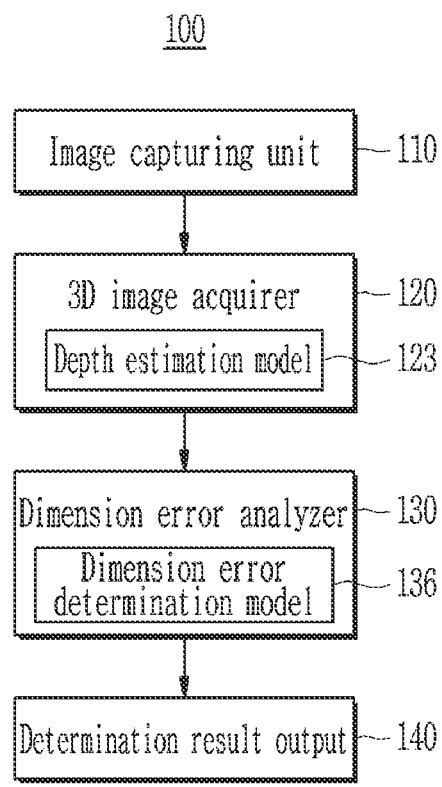
FIG. 1 is a diagram illustrating an apparatus for detecting a dimension error according to an embodiment of the present invention.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, a method and apparatus for detecting a dimension error according to embodiments of the present invention will be described in detail with reference to the accompanying drawings.

FIG. 1 is a diagram illustrating an apparatus for detecting a dimension error according to an embodiment of the present invention.

Referring to FIG. 1, an apparatus for detecting a dimension error 100 includes an image capturing unit 110, a 3D image acquirer 120, a dimension error analyzer 130, and a determination result output unit 140.

The image capturing unit 110 photographs a target object for which dimension error is to be determined, and transmits an image of the photographed target object to the 3D image acquirer 120. The image of the captured target object may be a single RGB image, may be a sequence RGB image, or may be a stereo image. The image capturing unit 110 may include a photographing device such as a camera mounted on a mechanical unit such as a robot arm or a conveyor. Also, the captured image of the target object may be a 3D image. When the captured image of the target object is a 3D image, the function of the 3D image acquirer 120 may not be necessary.

The 3D image acquirer 120 outputs a depth image including distance information between the image capturing unit 110 and the target object from the image transmitted from the image capturing unit 110. The depth image is transmitted to the dimension error analyzer 130.

The 3D image acquirer 120 may perform pre-processing on the input image in order to accurately measure the dimension of the target object. For example, the 3D image acquirer 120 can cut out only a region of interest (ROI) for which dimensions are to be measured from the input image. The 3D image acquirer 120 can convert to a high-resolution image through super-resolution processing when the resolution is low. Furthermore, if the resolution of the entire input image is low, the 3D image acquirer 120 can perform super-resolution processing on the entire input image.

The 3D image acquirer 120 may use a learned depth estimation model 123 to output a depth image including distance information. The depth estimation model 123 may learn to output a depth image including distance information corresponding to the image captured by the image capturing unit 110 and corresponding camera pose information when the image and the corresponding camera pose information are input. The camera pose information may include location and direction information of the image capturing unit 110 that has captured the image. On the other hand, if the image capturing unit 110 is fixed, since there is no change in camera pose, camera pose information may not be used.

The dimension error analyzer 130 performs a function of determining a dimension error on the target object. The dimension error analyzer 130 outputs the dimension error and related information using a learned dimension error determination model 136. The related information may include a location of an ROI for dimension measurement, information about a dimension of the location, and information about a dimension error.

The dimension error determination model 136 receives the image of the target object output from the image capturing unit 110 and the depth image of the target object output from the 3D image acquirer 120, and outputs information on whether the target object has a dimension error and related information of the target object. In addition, the dimension error determination model 136 may receive a 3D image of a target object output from the image capturing unit 110 and output whether the target object has a dimension error and related information.

The determination result output unit 140 outputs a dimension error determination result of the dimension error analyzer 130. The determination result output unit 140 may output the dimension error determination result through various methods such as sound, image, and light.

Figure 2:
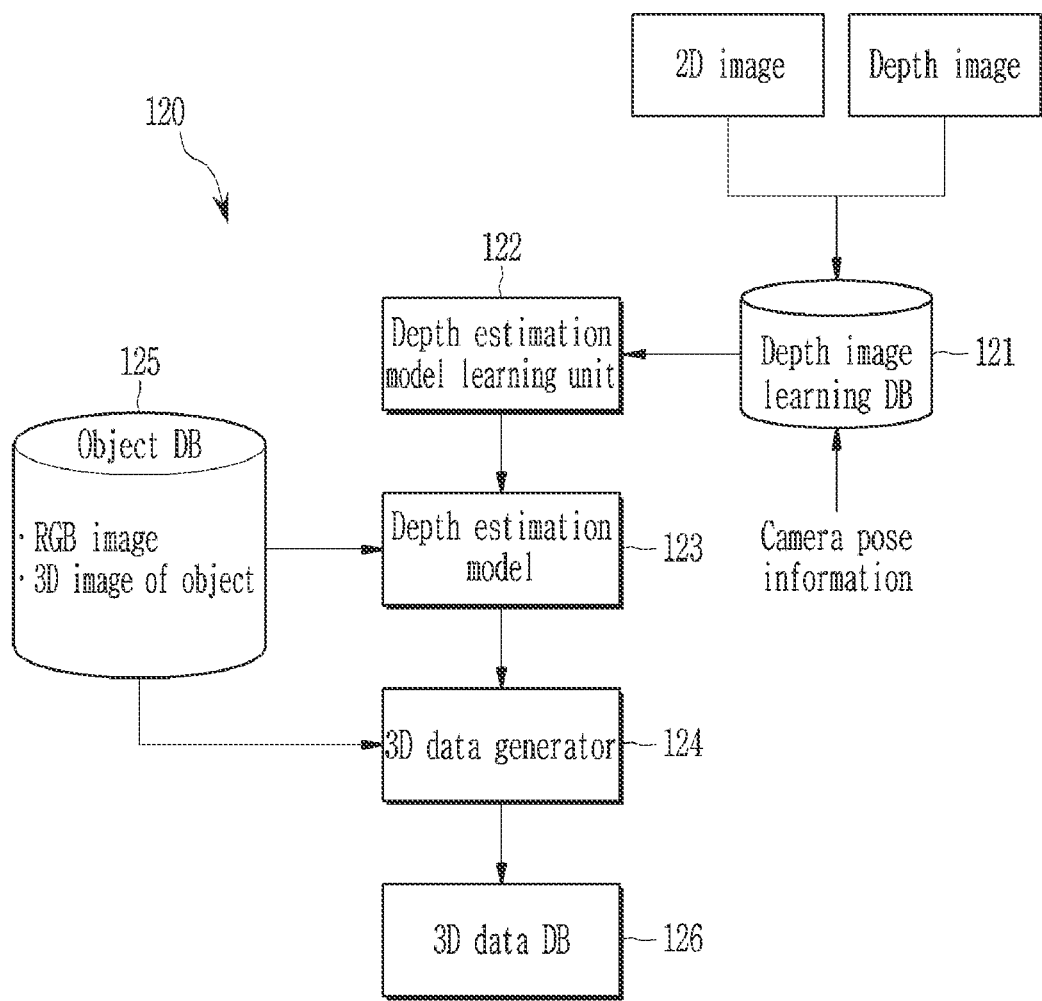
FIG. 2 is a diagram illustrating a 3D image acquirer shown in FIG. 1.

FIG. 2 is a diagram illustrating a 3D image acquirer shown in FIG. 1.

Referring to FIG. 2, the 3D image acquirer 120 includes a depth image learning database (DB) 121, a depth estimation model learning unit 122, a depth estimation model 123, and a 3D data generator 124, an object DB 125, and a 3D data DB 126. The depth image learning DB 121 and the depth estimation model learning unit 122 are used for learning the depth estimation model 123. The data of the 3D data generator 124, the object DB 125, and the 3D data DB 126 are used for learning the dimension error determination model 136 of the dimension error analyzer 130.

The depth image learning DB 121 stores a two-dimensional (2D) image of each object captured from cameras, a depth image that is 3D information about the 2D image of each object, and camera pose information of the camera that captured the each 2D image. The 2D image captured from the camera, the depth image including distance information corresponding to the 2D image, and the camera pose information are used as learning data for the depth estimation model 123.

The depth estimation model learning unit 122 learns the depth estimation model 123 using data stored in the depth image learning DB 121. The depth estimation model learning unit 122 may learn the depth estimation model 123 so that a depth image corresponding to the 2D image of each object and camera pose information is outputted when the 2D image of each object and camera pose information are input.

The learned depth estimation model 123 receives the image of the target object, and outputs the depth image of the target object.

The 3D data generator 124 generates an object 3D image DB 126 for learning the dimension error determination model 136 of the dimension error analyzer 130. The 3D data generator 124 inputs the 2D image of each object stored in the object DB 125 and the camera pose information of the image to the depth estimation model 123, and stores the depth image outputted from the depth estimation model 123 in the 3D data DB 126. Furthermore, the 3D data generator 124 stores the 3D image stored in the object DB 125 in the 3D data DB 126.

The object DB 125 includes a 2D image of each object and information necessary for determining the dimension error of each object. In addition, the object DB 125 may include a 3D image of each object and information necessary for determining the dimension error of each object. The information necessary for determining the dimension error of the object may include, for example, location information of the ROI, normal dimension information in each ROI, and the shape of the ROI. At this time, the shape of the ROI can be used as information to determine an approach method for measuring dimensions such as of a circle or a rectangle.

The object 3D image DB 126 may include a 2D image of each object, pose information of a camera in which the image is captured, and a depth image obtained by the depth estimation model 123 from this information. In addition, the object 3D image DB 126 may include a 3D image. The object 3D image DB 126 may be generated for each object.

Figure 3:
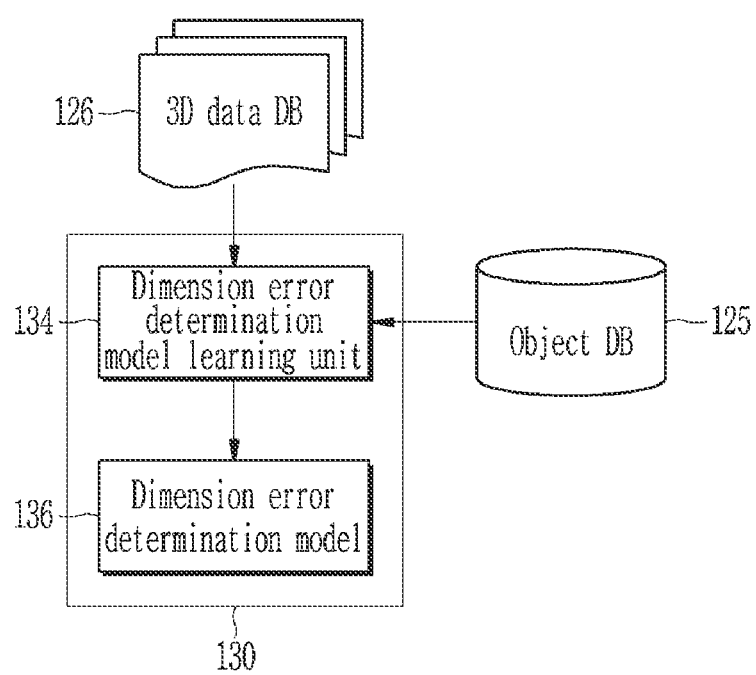
FIG. 3 is a diagram illustrating a dimension error analyzer shown in FIG. 1.

FIG. 3 is a diagram illustrating a dimension error analyzer shown in FIG. 1.

Referring to FIG. 3, the dimension error analyzer 130 includes a dimension error determination model learning unit 134 and a dimension error determination model 136. The dimension error determination model learning unit 134 may be implemented as a separate external device.

The dimension error determination model learning unit 134 may learn the dimension error determination model 136 using a 2D image of each object stored in the object 3D image DB 126, camera pose information and depth image, and information necessary for determining the dimension error of each object. The dimension error determination model learning unit 134 may learn the dimension error determination model 136 using a 3D image of each object and information necessary for determining the dimension error of each object.

When receiving a 2D image of the target object and a depth image obtained from the 2D image, the dimension error determination model 136 outputs a dimension error of the target object and detailed information related to the error. In addition, when receiving a 3D image of the target object, the dimension error determination model 136 outputs a dimension error of the target object and detailed information related to the error. The information on whether the target object has a dimension error can be indicated by 1-bit information such as 0 or 1. The detailed information to the error may include location information, dimension information of an ROI with a dimension error, and image information of the ROI.

Figure 4:
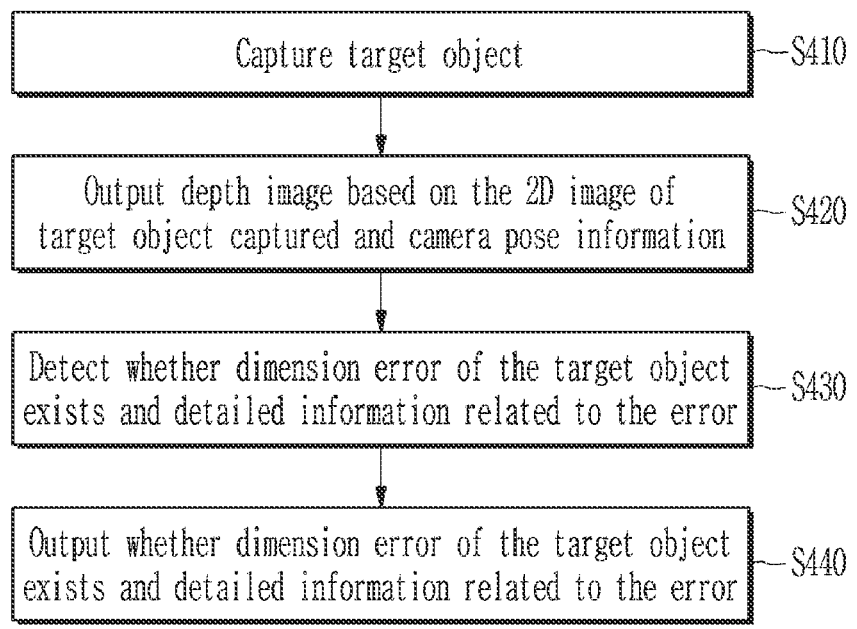
FIG. 4 is a diagram illustrating a method for determining a dimension error from a 2D image in the dimension error determination apparatus shown in FIG. 1.

FIG. 4 is a diagram illustrating a method for determining a dimension error from a 2D image in the dimension error determination apparatus shown in FIG. 1.

Referring to FIG. 4, the image capturing unit 110 captures a target object for which dimension error is to be determined (S410), and transfers a 2D image and camera pose information of the captured target object to the 3D image acquirer 120. In addition, the 2D image of the target object is also transmitted to the dimension error analyzer 130.

The depth estimation model 123 of the 3D image acquirer 120 outputs a depth image including distance information between the image capturing unit 110 and the target object based on the input 2D image and camera pose information (S420), and transmits the depth image outputted from the depth estimation model 123 to the dimension error analyzer 130.

The dimension error determination model 136 of the dimension error analyzer 130 detects whether a dimension error of the target object exists and detailed information related to the error based on the 2D image of the target object and the corresponding depth image (S430). The dimension error determination model 136 may or may not output dimension information according to the target object. The dimension error determination model 136 may determine whether a dimension error of the target object exists without measuring the exact dimension when dimensional information is not required. The dimension error determination model 136 may output the location of the ROI. The location of the ROI may be specified in advance in the learning step, or the ROI may be separately detected through a device and the location information of the ROI may be input to the dimension error determination model 136.

Meanwhile, when a 3D image is acquired from the image capturing unit 110, the 3D image is transmitted to the dimension error analyzer 130.

The dimension error determination model 136 of the dimension error analyzer 130 may detect whether a dimension error of the target object exists and detailed information related to the error based on a 3D image of the target object.

The determination result output unit 140 outputs whether a dimension error of the target object exists and detailed information related to the error (S440).

Figure 5:
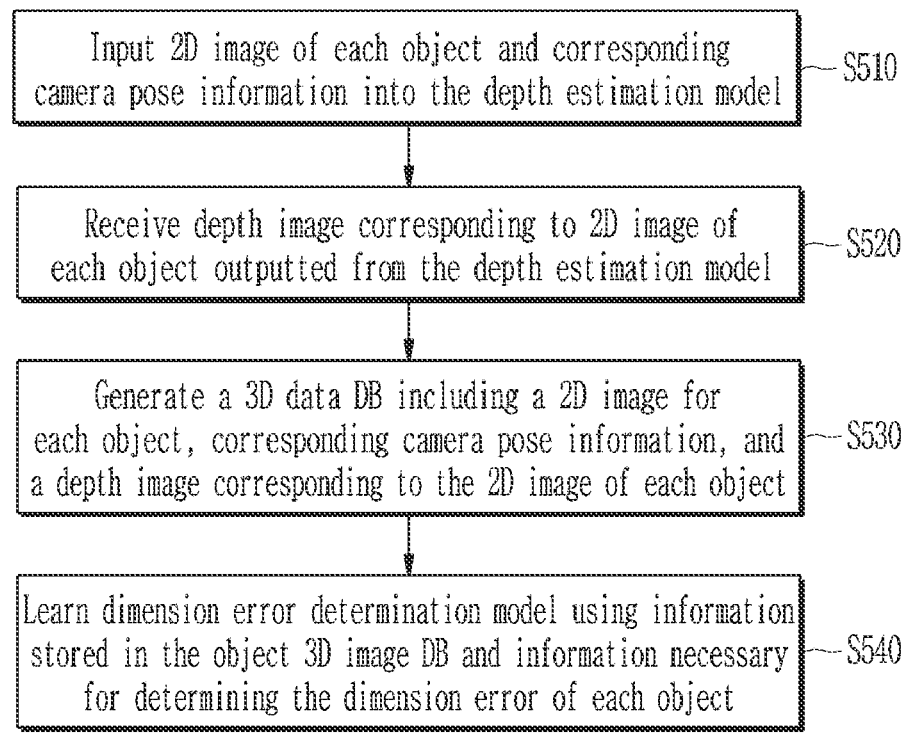
FIG. 5 is a diagram illustrating a method of learning the dimension error determination model shown in FIG. 1.

FIG. 5 is a diagram illustrating a method of learning the dimension error determination model shown in FIG. 1.

Referring to FIG. 5, the 3D data generator 124 inputs a 2D image of each object stored and corresponding camera pose information in the object DB 125 into the depth estimation model 123 (S510), and receives a depth image corresponding to a 2D image of each object outputted from the depth estimation model 123 (S520).

The 3D data generator 124 generates a 3D data DB 126 including a 2D image for each object, corresponding camera pose information, and a depth image corresponding to the 2D image of each object (S530). When a 3D image of each object is stored in the object DB 125, the 3D data generator 124 may generate the 3D data DB 126 by using the 3D image of the object.

The dimension error determination model learning unit 134 may learn the dimension error determination model 136 using a 2D image of each object stored in the object 3D image DB 126, camera pose information and depth image, and information necessary for determining the dimension error of each object (S540). The dimension error determination model learning unit 134 may learn the dimension error determination model 136 using a 3D image of each object and information necessary for determining the dimension error of each object. In this case, information necessary for determining the dimension error of each object may include information on objects having a dimension error and information on objects without a dimensional error.

The dimension error determination model 136 outputs whether a dimension error of the target object exists and detailed information related to the error when a 2D image of a target object for which dimension error is to be determined and a corresponding depth image are input into the dimension error determination model 136. In addition, when a 3D image of a target object for which a dimension error is to be determined may be input into the dimension error determination model 136, and the dimension error determination model 136 may output whether a dimension error of the target object exists and detailed information related to the error.

As described above, in an embodiment of the present invention, the dimension error may be determined from the image of the target object captured from a camera through data-based learning without not only a camera for measuring depth but also additional sensors such as a laser sensor, a TOF (time of flight) sensor, and a structured light sensor.

Figure 6:
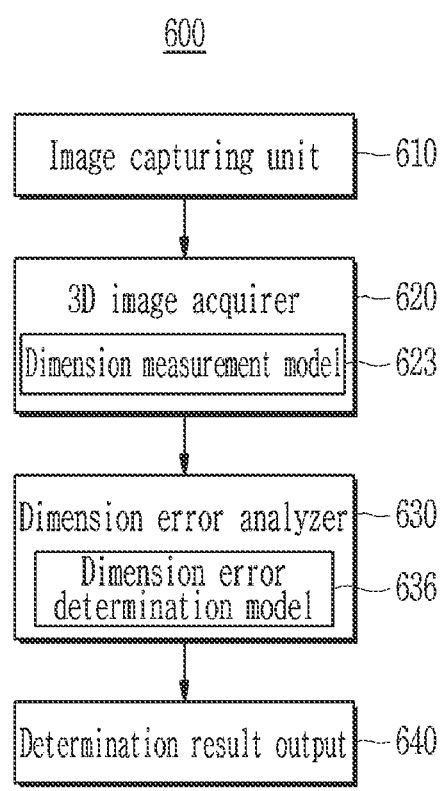
FIG. 6 is a diagram illustrating an apparatus for detecting a dimension error according to another embodiment of the present invention.

FIG. 6 is a diagram illustrating an apparatus for detecting a dimension error according to another embodiment of the present invention.

Referring to FIG. 6, an apparatus for detecting a dimension error 600 is different from the apparatus for detecting a dimension error 100 shown in FIG. 1, in that the apparatus 600 does not use distance information between the image capturing unit 610 and the target object, but uses the size of the target object, that is, the dimension value of the target object.

The apparatus for detecting a dimension error 600 includes an image capturing unit 610, a 3D image acquirer 620, a dimension error analyzer 630, and a determination result output unit 640. At this time, since the image capturing unit 610 and the determination result output unit 640 are same as the image capturing unit 110 and determination result output unit 140 shown in FIG. 1, detailed descriptions are omitted.

The 3D image acquirer 620 estimates dimension data of the target object using the image received from the image capturing unit 610, and generates 3D data of the target object using dimension data of the target object. The 3D image acquirer 620 may use a learned dimension measurement model 623 for estimating the dimension data of the target object.

A dimension measurement model 623 may be learned to output corresponding dimension data when the image captured from the image capturing unit 610 is input.

The dimension error analyzer 630 may receive the dimension data of the target object output from the 3D image acquirer 620, and may output the dimension error of the target object and the related information using a learned dimension error determination model 636.

Figure 7:
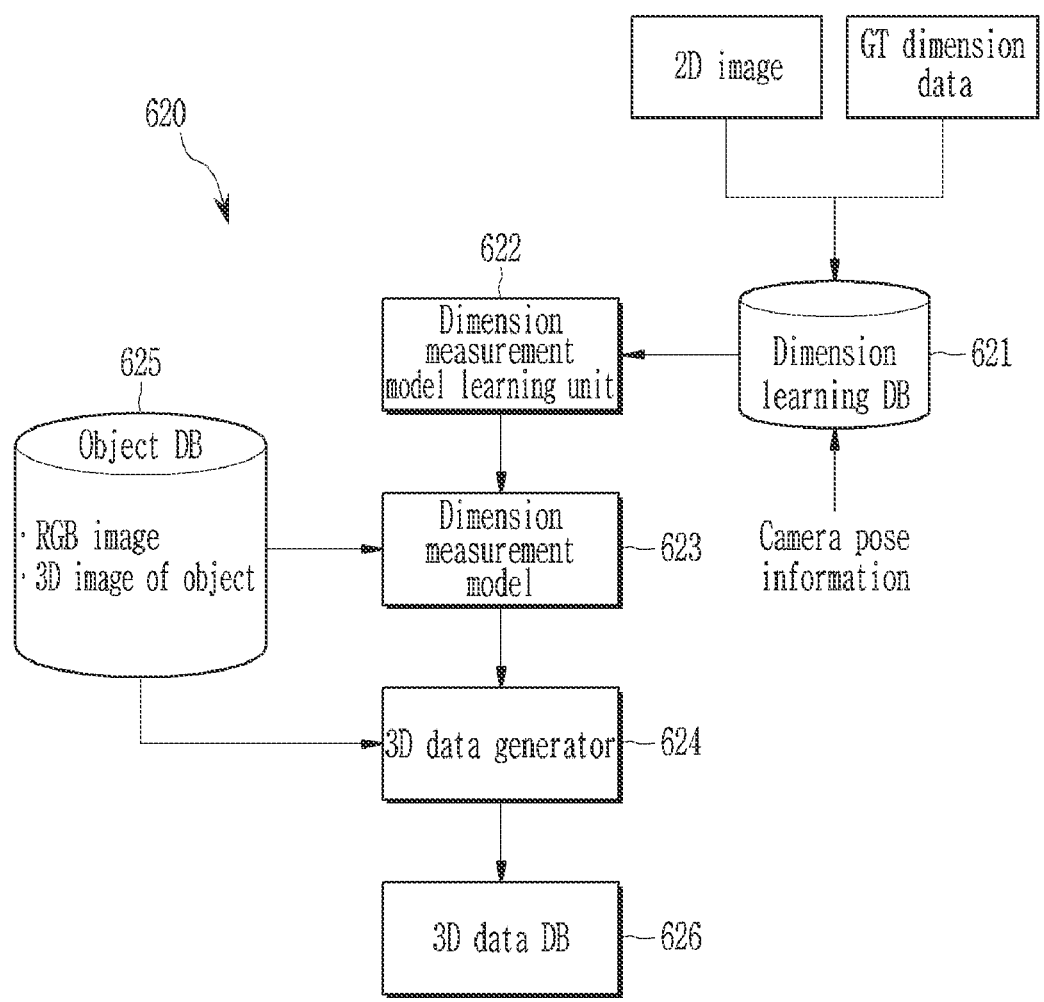
FIG. 7 is a diagram illustrating a 3D image acquirer shown in FIG. 6.

FIG. 7 is a diagram illustrating a 3D image acquirer shown in FIG. 6.

Referring to FIG. 7, the 3D image acquirer 620 includes a dimension learning DB 621, a dimension measurement model learning unit 622, a dimension measurement model 623, and a 3D data generator 624, an object DB 625, and a 3D data DB 626.

The dimension learning DB 621 stores a 2D image of each object captured from the image capturing unit 610 and dimension data of the corresponding object. The dimension data, for example, may include height value of each pixel of 2D. Furthermore, the dimension data can be expressed in the form of 3D data as a height value of each pixel.

The dimension learning DB 621 may store camera pose information of the camera that captured each 2D image. The 2D image of each object, the dimension information, and the camera pose information stored in the dimension learning DB 621 are used for learning the dimension measurement model 623.

The dimension measurement model learning unit 622 learns the dimension measurement model 623 using the 2D image of each object, the dimension information, and the camera pose information stored in the dimension learning DB 621. The dimension measurement model learning unit 622 may learn the dimension measurement model 623 so that a dimension data of the corresponding object is outputted when the 2D image of each object and camera pose information are input. At this time, the camera pose information may be omitted.

The learned dimension measurement model 623 receives the image of the target object, and outputs the dimension data corresponding to the image of the target object.

The 3D data generator 624 generates an object 3D image DB 626 for learning the dimension error determination model 636 of the dimension error analyzer 630. The 3D data generator 624 inputs the 2D image of each object stored in the object DB 625 and the camera pose information of the image to the dimension measurement model 623, and stores the dimension data outputted from the dimension measurement model 623 in the 3D data DB 626.

The object DB 625 includes a 2D image of each object and information necessary for determining the dimension error of each object. The information necessary for determining the dimension error of the object may include, for example, location information of the ROI, normal dimension information in each ROI, and the shape of the ROI. At this time, the shape of the ROI can be used as information to determine an approach method for measuring dimensions such as a circle or a rectangle.

The object 3D image DB 626 may include a 2D image of each object, pose information of a camera in which the image is captured, and dimension data obtained by the dimension measurement model 623 from this information. The 2D image of each object, camera pose information, and dimension data in the object 3D image DB 626 are used for learning the dimension error determination model 636.

Figure 8:
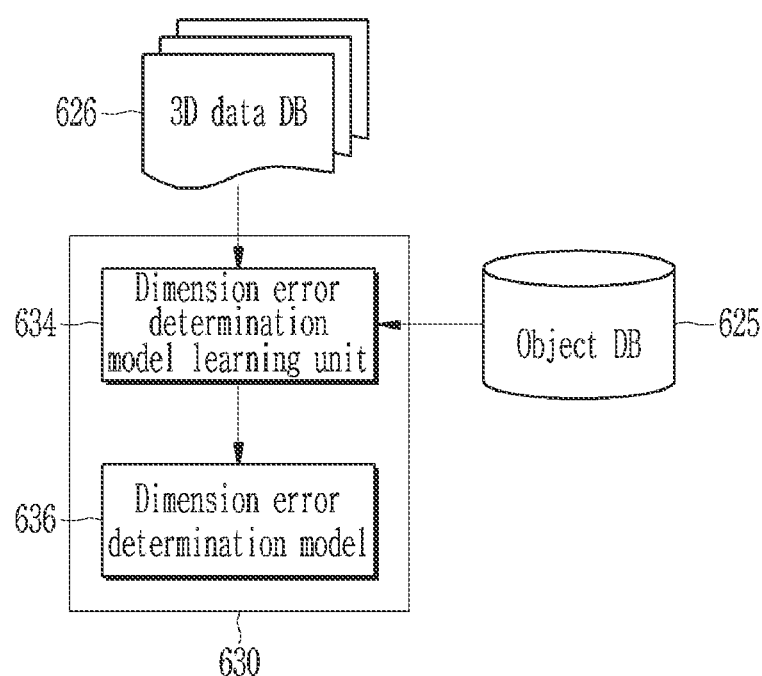
FIG. 8 is a diagram illustrating a dimension error analyzer shown in FIG. 6.

FIG. 8 is a diagram illustrating a dimension error analyzer shown in FIG. 6.

Referring to FIG. 8, the dimension error analyzer 630 includes a dimension error determination model learning unit 634 and a dimension error determination model 636.

The dimension error determination model learning unit 634 may learn the dimension error determination model 636 using a 2D image of each object, camera pose information, and dimension data obtained by the dimension measurement model 623, and information necessary for determining the dimension error of each object.

When receiving a 2D image of the target object, and dimension data obtained by the dimension measurement model 623 from the 2D image of the target object, the dimension error determination model 636 outputs a dimension error of the target object and detailed information related to the error. The information on whether the target object has a dimension error can be indicated by 1-bit information such as 0 or 1. The detailed information to the error may include location information, dimension information of an ROI with a dimension error, and image information of the ROI.

Figure 9:
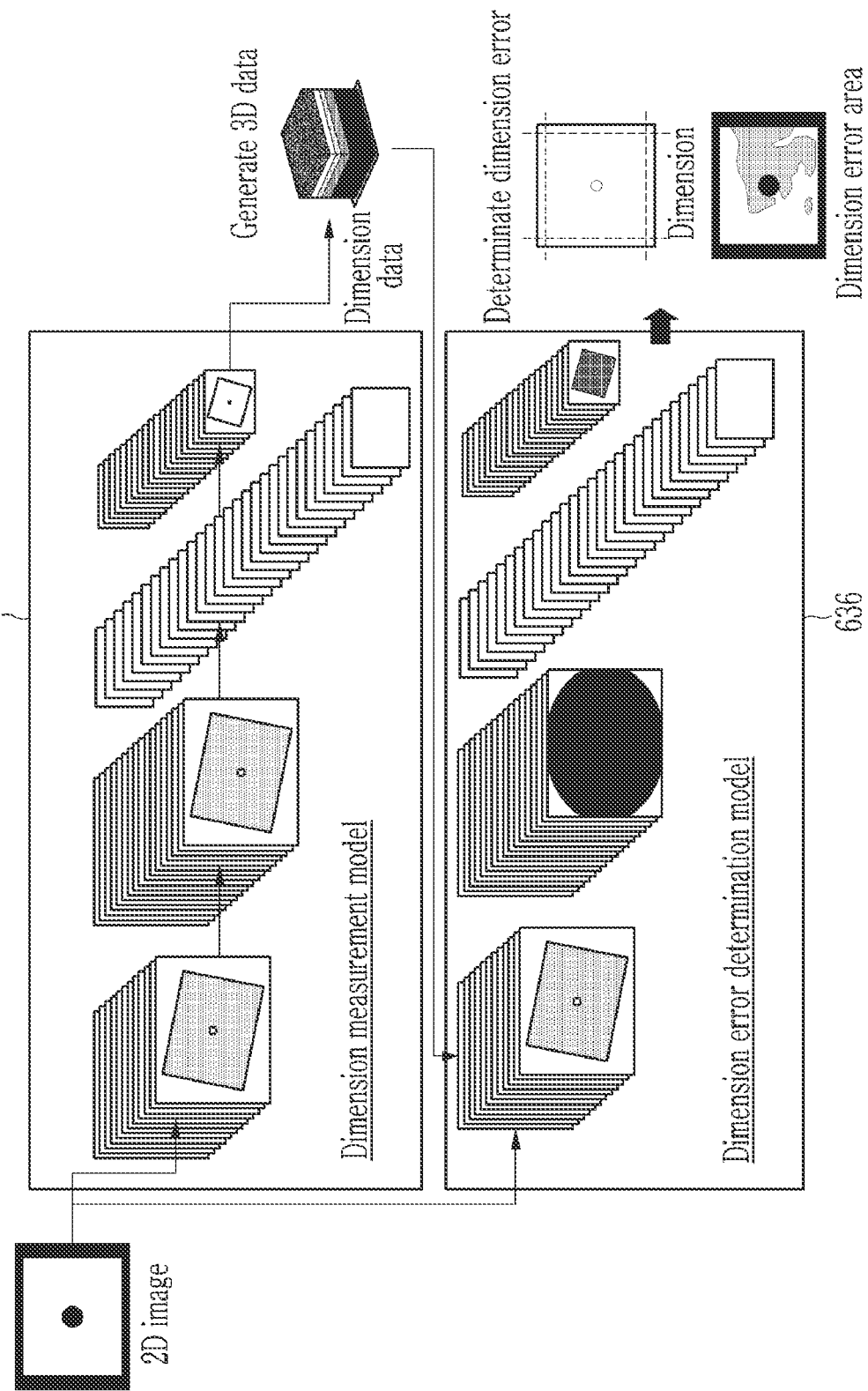
FIG. 9 is a conceptual diagram showing a method for detecting a dimension error from a 2D image in an apparatus for detecting a dimension error illustrated in FIG. 6.
Figure 10:
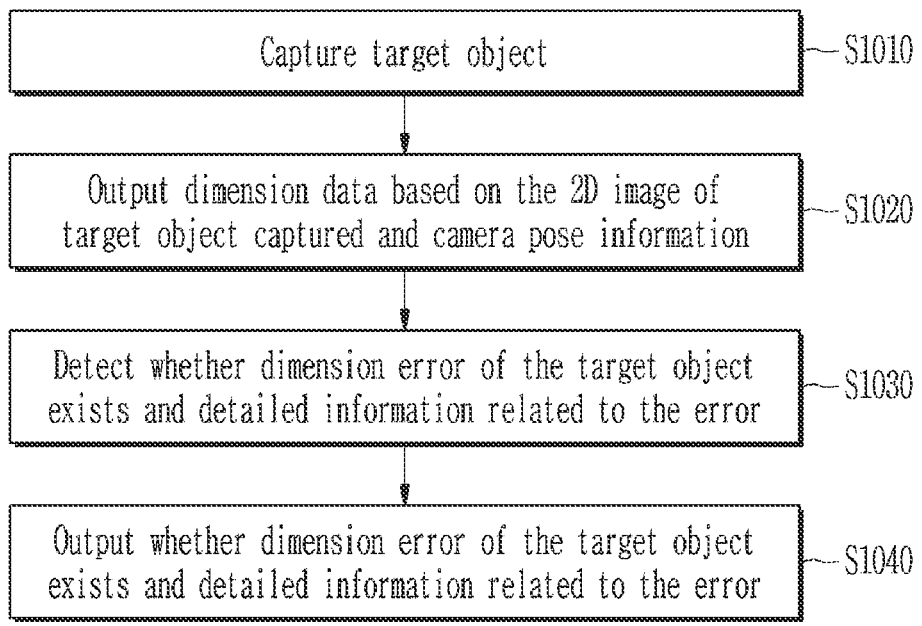
FIG. 10 is a flowchart illustrating a method for detecting a dimension error in an apparatus for detecting a dimension error illustrated in FIG. 6.

FIG. 9 is a conceptual diagram showing a method for detecting a dimension error from a 2D image in an apparatus for detecting a dimension error illustrated in FIG. 6. FIG. 10 is a flowchart illustrating a method for detecting a dimension error in an apparatus for detecting a dimension error illustrated in FIG. 6.

Referring to FIGS. 9 and 10, the image capture unit 610 captures a 2D image of a target object for which a dimension error is to be determined (S1010).

The 2D image of the captured target object and camera pose information are transmitted to the dimension measurement model 623 of the 3D image acquirer 620. In addition, the 2D image of the target object is also transmitted to the dimension error analyzer 630.

The dimension measurement model 623 estimates and outputs dimension data of the target object from the input 2D image of the target object and camera pose information (S1020). The dimension data may be output in a form of 3D data. The dimension data output from the dimension measurement model 623 is transmitted to the dimension error analyzer 630.

The dimension error determination model 636 of the dimension error analyzer 630 detects a dimension error of the target object from the 2D image of the target object and dimensional information corresponding to the 2D image of the target object. The dimension error determination model 636 may detect whether a dimension error of the target object exists and detailed information related to the error (S1030). The dimension error determination model 636 may or may not output dimension data according to the target object. The detailed information related to error may include dimension data and information on a dimension error area. The dimension error determination model 636 may output the location of the ROI. The location of the ROI may be specified in advance in the learning step, or the ROI may be separately detected through a device and the location information of the ROI may be input to the dimension measurement model 623 and the dimension error determination model 636.

The determination result output unit 640 outputs whether a dimension error of the target object exists and detailed information related to the error (S1040).

Meanwhile, the dimensional data to be measured may have a discretization characteristic that does not appear as a continuous value. In the case of dimensional data having a discretization characteristic, when the dimensional measurement model 623 is learned, the precision of the dimensional data in a specific range can be increased, thereby enabling more 99) accurate and precise dimensional measurement.

For example, in measuring the size of a small object, if the normal dimension is 10.000 mm and the dimensional acceptable error range of this object is ±5 um, the data change in units of 1 um near the acceptable error range of 10.005-9.995 mm is very important. That is, for values around 10.000 mm of the normal dimension, and when the dimension measurement model 623 more sensitively detects change in values, and is trained, the dimension measurement model 623 can react sensitively to the values around the objective value. As a result, the performance of the dimension measurement model 623 can be improved. This embodiment will be described in detail with reference to FIG. 11.

Figure 11:
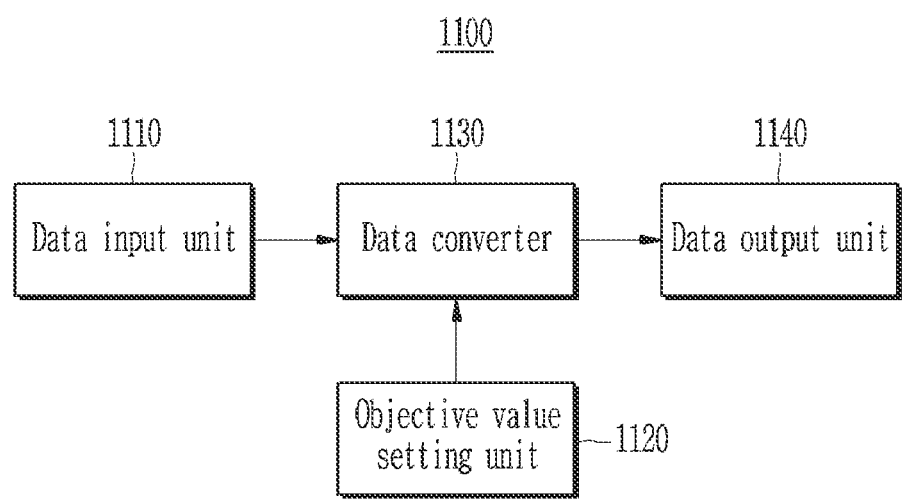
FIG. 11 is a diagram illustrating an apparatus for enhancing data sensitivity according to an embodiment of the present invention.

FIG. 11 is a diagram illustrating an apparatus for enhancing data sensitivity according to an embodiment of the present invention.

Referring to FIG. 11, the apparatus for enhancing data sensitivity 1100 includes a data input unit 1110, an objective value setting unit 1120, a data converter 1130, and a data output unit 1140. The apparatus for enhancing data sensitivity 1100 is connected to the output terminal of the dimension measurement model 623 and may be used when the dimension measurement model 623 is learning.

The data input unit 1110 receives input data for enhancing the sensitivity of the data. In this time, the input data may include estimated dimension data output from the dimension measurement model 623 and ground truth dimension data.

The objective value setting unit 1120 sets a value or range for which sensitivity is to be enhanced. The value or range for which the sensitivity is to be enhanced is called the objective value. For example, if the normal dimension is 10.000 mm and the dimensional tolerance range is ±5 um, the objective value can be set in the range of 9.95 to 10.005 mm.

The data converter 1130 generates an objective function for converting input data based on the objective value, and converts the input data using the objective function and outputs the converted data. The objective function is a function that calculates and returns an output value for input data. The objective function converts the input data corresponding to the objective value, and outputs converted data. In particular, the objective function is a function that increases a change of the input data.

The data output unit 1140 outputs data converted by the data converter 1130.

According to an embodiment of the present invention, the data converter 1130 converts data input to a loss function when learning the dimension measurement model 623 using an objective function, so that the dimension measurement model 623 can sensitively learn for dimensional data corresponding to the objective value.

Figure 12:
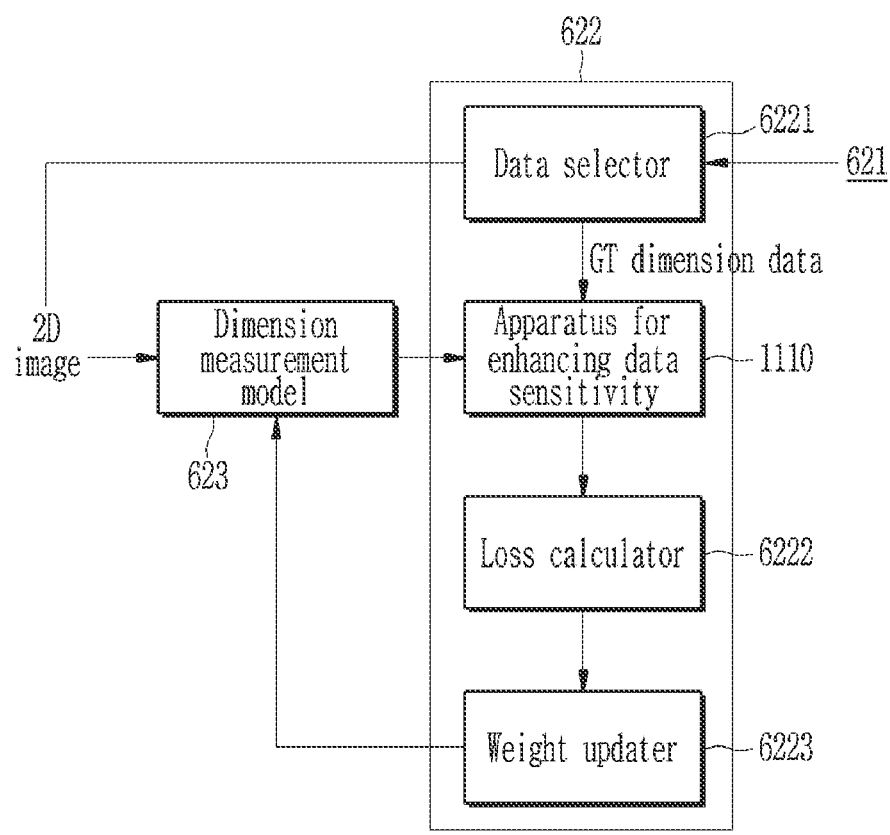
FIG. 12 is a diagram illustrating an example of a dimension measurement model learning unit to which an apparatus for enhancing data sensitivity according to an embodiment of the present invention is applied.

FIG. 12 is a diagram illustrating an example of a dimension measurement model learning unit to which an apparatus for enhancing data sensitivity according to an embodiment of the present invention is applied.

Referring to FIG. 12, the dimension measurement model learning unit 622 may include a data selector 6221, an apparatus for enhancing data sensitivity 1100, a loss calculator 6222, and a weight updater 6223.

The data selector 6221 selects 2D images of objects and corresponding ground truth (GT) dimension data for learning from the dimension learning DB 621, transmits the 2D images to the dimension measurement model 623, and transmits the corresponding GT dimension data to the data input unit 1110 of the apparatus for enhancing data sensitivity 1110.

The dimension measurement model 623 generates estimated dimension data for the 2D image received from the data selector 6221, and transmits the estimated dimension data to the data input unit 1110 of the apparatus for enhancing data sensitivity 1100.

The data convertor 1130 of the apparatus for enhancing data sensitivity 1100 converts the estimated dimension data and the corresponding GT dimension data using an objective function, respectively.

The objective function can be basically generated as shown in Equation 1.

$$z=\log(c1+1-x) \qquad \text{(Equation 1)}$$

Here, c1 represents an objective value or a range of objective value, x represents input data, and z represents an output value of the objective function. In addition, the value of 1 in (c1+1−x) represents a threshold value in the log function.

The objective function can be generated as shown in Equation 2.

$$z=\log(\text{abs}(\log(c1+1-x)))*\rho \qquad \text{(Equation 2)}$$

The objective function can be generated as shown in Equation 3.

$$z=\text{abs}(\log(\text{abs}(\log(\text{abs}(c1+1-x)))))*\rho \qquad \text{(Equation 3)}$$

Here, ρ is a weight constant for enhancing sensitivity, and the value of the output data becomes larger by p. Furthermore, the abs(x) function returns the absolute value of z.

In Equation 2, (c1+1−x) may be used instead of abs(c1+1−x).

In addition, the objective function shown in Equation 3 can be modified as in Equation 4.

$$z=\text{abs}(\log(\text{abs}(\ominus *\log(\text{abs}(c1+1-x)))))*\rho \qquad \text{(Equation 4)}$$

Here, ⊖ is a constant for changing the sensitivity-responsive range, and if a value less than 1 (for example, 0.5) is used as ⊖, the sensitivity-responsive range becomes wider.

The objective function shown in Equation 2 can also be modified by applying ⊖.

In addition, the objective function shown in Equation 3 can be modified as in Equation 5.

$$z=\text{abs}(\log((\sigma+\text{abs}(\log(\sigma+\text{abs}(10+1-x)))))) \qquad \text{(Equation 5)}$$

In Equation 5, σ represents a dummy value. For example, log(0) can generate an infinite (Inf) value. Also, a Not a Number (NaN) value or an Inf value may be generated by log(log(*)). Accordingly, a small value a may be added so that NaN or Inf values are not generated or a maximum value corresponding to the Inf value may be set. σ is used to prevent the value of the log function from becoming 0, and may be considerably smaller than the input data (x) and the objective value (c1). For example, when x has a range of 0 to 11.5, σ may be set to $1e^{-5}$, that is, 0.00001.

In this way, the objective function may be variously generated in a form in which the change in the values of the input data is changed to a larger value within the range of the objective value and output changed values. At this time, the value between the output values can be calculated through interpolation between the output values, and if values calculated by the interpolation are added between the output values, more precise data may be obtained.

According to the embodiment of the present invention, the estimated dimension data of the model 623 and the GT dimension data are not used as the input data of a loss function, the values of which the estimated dimension data of the model 623 and the GT dimension data are converted by using the objective function are used as the input data of the loss function, respectively. For example, if the estimated dimension data of the dimension measurement model 623 and the GT dimension data are converted using the objective function shown in Equation 2, it can be expressed as Equation 6.

$$z=\log(abs(\log(c1+1-D)))*\rho$$

$$z^*=\log(abs(\log(c1+1-D^*)))*\rho \quad \text{(Equation 6)}$$

In general, a loss function such as Equation 7 is used for model learning.

$$d=D-D^* \quad \text{(Equation 7)}$$

The loss function d represents the difference between the value D estimated by the model and the GT value D*.

The loss function of Equation 7 may be modified and used as in Equation 8.

$$d=\log(D)-\log(D^*) \quad \text{(Equation 8)}$$

In an embodiment of the present invention, the estimated dimension data of the dimension measurement model 623 and the GT dimension data are not input to the loss function, and are values that are converted by the data converter 1130 of the apparatus for enhancing data sensitivity that are input to the loss function, and a difference value between the estimated dimension data of the dimension measurement model 623 and the GT dimension data is calculated as shown in Equation 9.

$$d\_loss=\log(z)-\log(z^*) \quad \text{(Equation 9)}$$

That is, the loss calculator 6222 calculates the difference by using the estimated dimensional data (z) and GT dimensional data (z*) converted by the data converter 1130 of the apparatus for enhancing data sensitivity, respectively.

In this way, the difference between the estimated dimension data of the dimension measurement model 623 and the GT dimension data within the set objective value range may be greatly changed, and the output changed difference may be output. For example, when the range of the objective value is between 8 and 10, the conventional loss function outputs a small difference value within this range, but the loss function shown in Equation 7 outputs the larger difference value within this range.

Meanwhile, the objective function shown in Equation 2 may be inversely transformed as in Equation 10.

$$x=c1-\{\exp(\exp(-z/\rho))\},$$

$$x=-\exp(\exp(-z/\rho)),$$

$$x=\exp(-\exp(-z/\rho)),$$

$$x=-\exp(-\exp(-z/\rho)) \quad \text{(Equation 10)}$$

Through this inverse transform function, the range of input data x can be checked. For example, it can be seen that the input data x is represented by Equation 11.

$$x=c1-\exp(-\exp(-z/\rho)) \quad \text{(Equation 11)}$$

The weight updater 6223 updates the weights set in the dimension measurement model 623 to minimize the output value of the loss function based on data output through the data output unit 1140 of the apparatus for enhancing data sensitivity 1100.

In particular, the weight updater 6223 reacts more sensitively to the dimensional data corresponding to the range of the objective value range based on the data output through the data output unit 1140 of the apparatus for enhancing data sensitivity 1100, and updates the weights set in set in the dimension measurement model 623. Then, the dimensional measurement model 623 can operate with higher accuracy on dimensional data corresponding to the range of the objective value.

Figure 13:
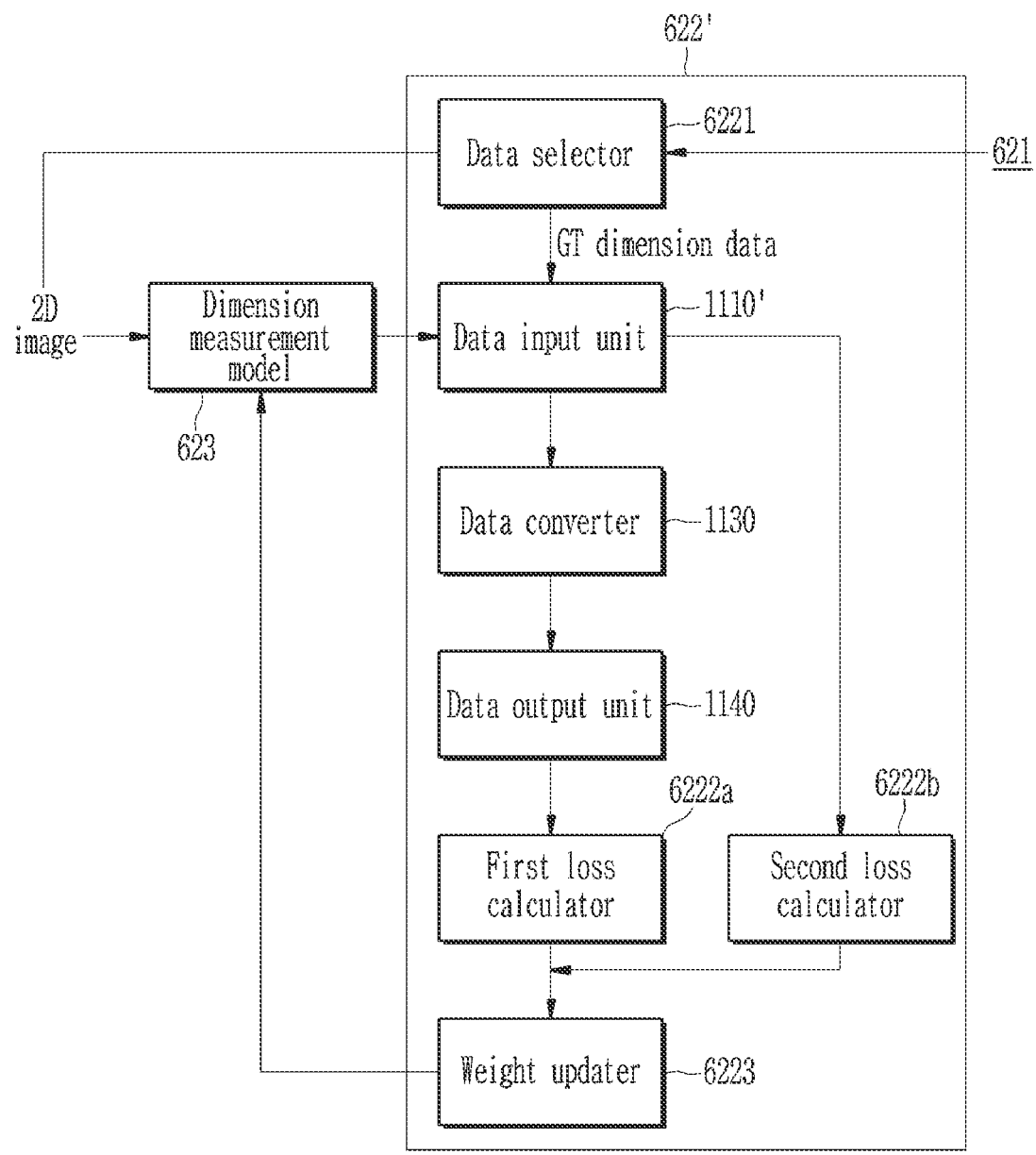
FIG. 13 is a diagram illustrating another example of a dimension measurement model learning unit to which an apparatus for enhancing data sensitivity according to an embodiment of the present invention is applied.

FIG. 13 is a diagram illustrating another example of a dimension measurement model learning unit to which an apparatus for enhancing data sensitivity according to an embodiment of the present invention is applied.

Referring to FIG. 13, a dimensional measurement model learning unit 622' may include a first loss calculator 6222a and a second loss calculator 6222b.

At this time, the data input unit 1110' of the apparatus for enhancing data sensitivity 1100 checks whether the data input from the dimension measurement model 623 are data corresponding to a sensitive range or a non-sensitive range. A data input unit 1110' may classify the input data into data corresponding to the sensitive range and data corresponding to a non-sensitive range based on the range of the objective value. For example, data of 11.0 or more of the total data based on the objective value may be classified as data of the sensitive range, and data of 0 to less than 11 may be classified as data of the non-sensitive range. The data input unit 1110' transfers the data corresponding to the sensitive range and the GT data corresponding thereto to the data convertor 1130, and transfers the data corresponding to the non-sensitive range and the GT data corresponding thereto to the second loss calculation unit 6622b without going through the data convertor 1130.

The first loss calculator 6222a calculates the difference between the estimated dimensional data z and the GT dimensional data z*, converted by the data convertor 1130, respectively, as shown in Equation 9, and transfers the calculated values to the weight updater 6223.

The second loss calculator 6622b calculates the difference between the estimated dimensional data and the GT dimensional data without converting the apparatus for enhancing data sensitivity 1100, and transfers the calculated values to the weight updater 6223. That is, the second loss calculator 6222b may calculate the difference between the estimated dimension data of the dimension measurement model 623 and the GT dimension data by using the loss function of Equation 7 or 8.

Figure 14:
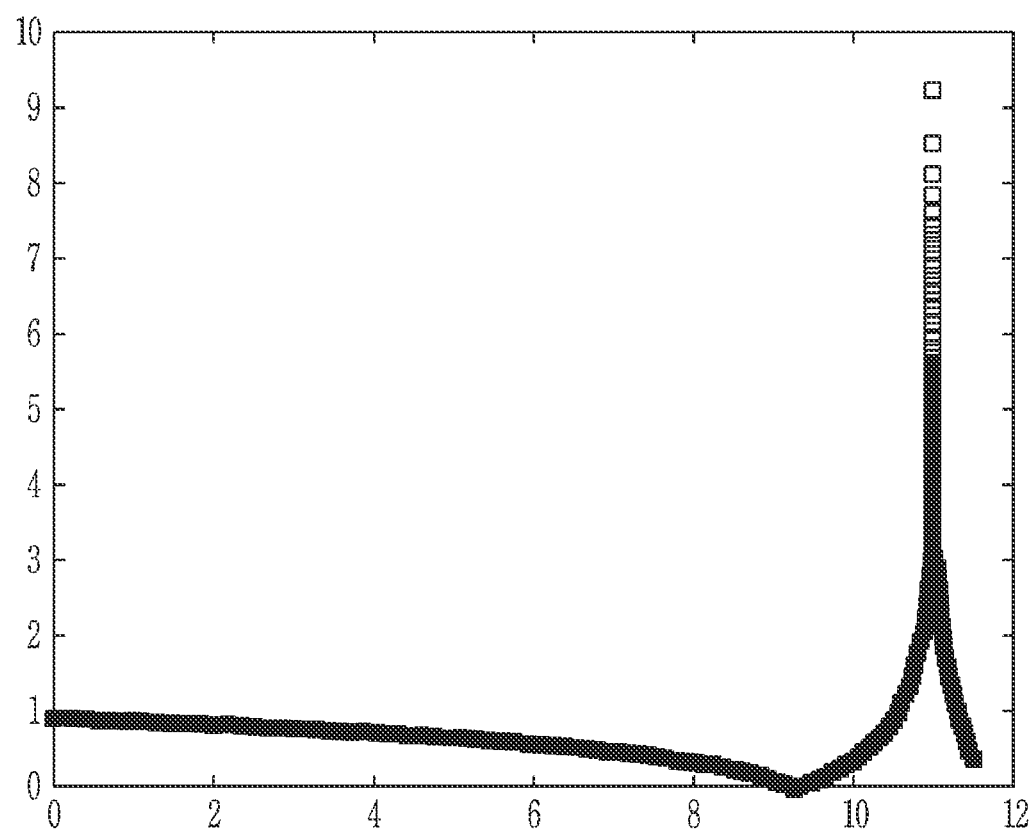
FIGS. 14 and 15 are diagrams illustrating an example of output values of an objective function for the input data according to an embodiment of the present invention, respectively.
Figure 15:
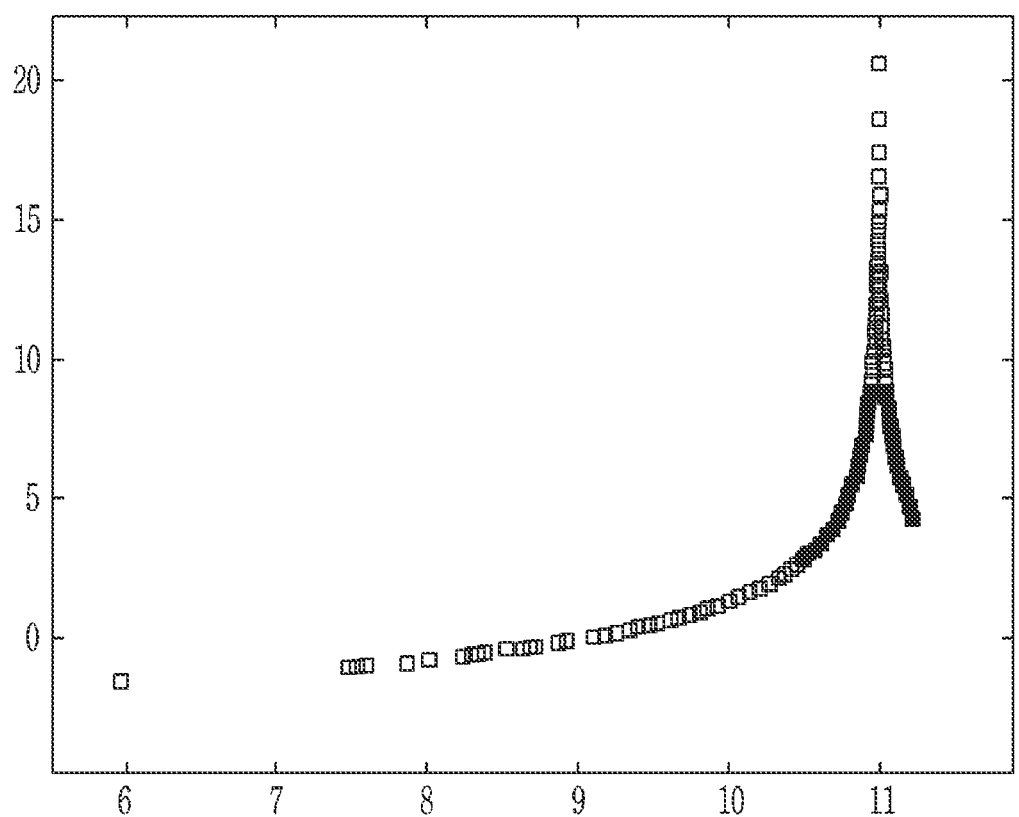

FIGS. 14 and 15 are diagrams illustrating an example of output values of an objective function for the input data according to an embodiment of the present invention, respectively.

In FIG. 14, the objective function ($\rho=1$) shown in Equation 3 is used, and in FIG. 15, $\rho=3$ is applied to the objective function shown in Equation 3.

For input data that varies from −0.213 to 11.499 mm, when precise observation is required in units of 0.001 mm near 11 mm, the objective value in the objective function shown in Equation 3 is set to 11 mm. When −0.213 to 11.499 mm are input to the set objective function as the input data (x), the output value z is output as shown in FIG. 14. That is, it can be seen that in the input data between 10 and 12 mm, which is around the objective value of 11 mm, the output value z changes from 1 to 10 by about "9" or more for about a change of the input values of "2".

In addition, as shown in FIG. 15, when $\rho$ is applied as a number other than 1 (for example, $\rho=3$), it can be seen that the amount of change in the output value z changes more according to p.

When the values of the loss function for model learning are calculated using the values converted by the objective function, the model that is precisely adjusted within the range of the objective value can be generated.

An effect of applying the apparatus for enhancing data sensitivity for learning the dimension measurement model according to an embodiment of the present invention will be described with reference to FIGS. 16 to 18.

Figure 16:
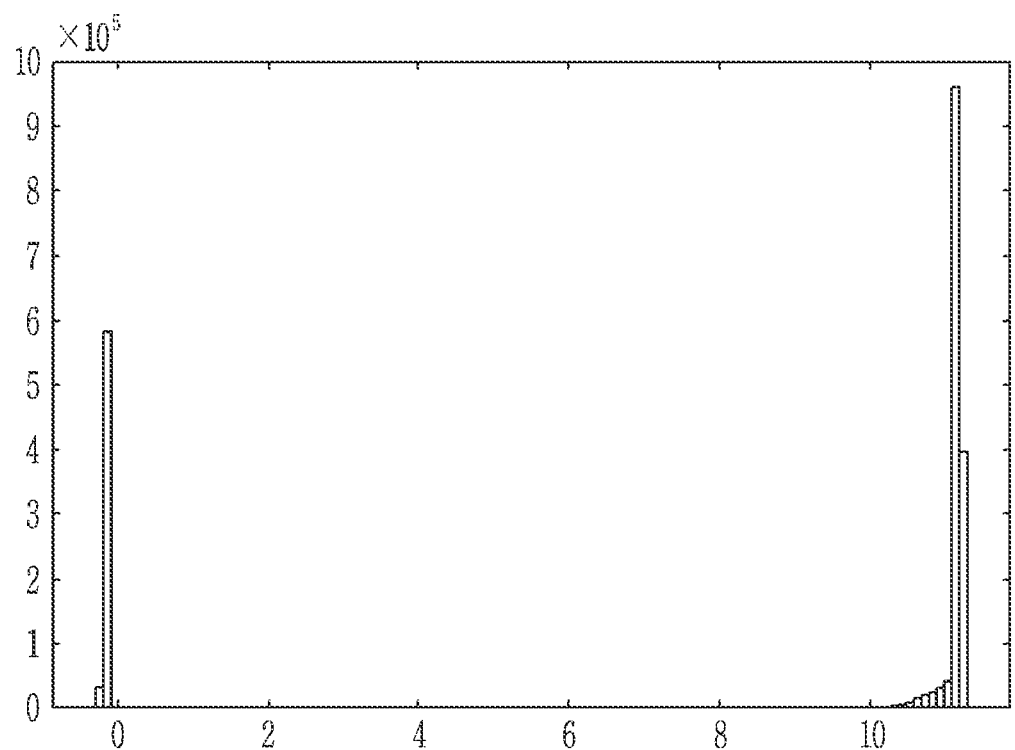
FIG. 16 is a diagram illustrating an example of height values of a ceramic product.

FIG. 16 is a diagram illustrating an example of height values of a ceramic product.

As shown in FIG. 16, the ceramic product has a height of approximately to 11 mm. This value can represent the estimated values of the dimensional measurement model. Here, 0 represents the height of the bottom surface of the ceramic product.

Figure 17:
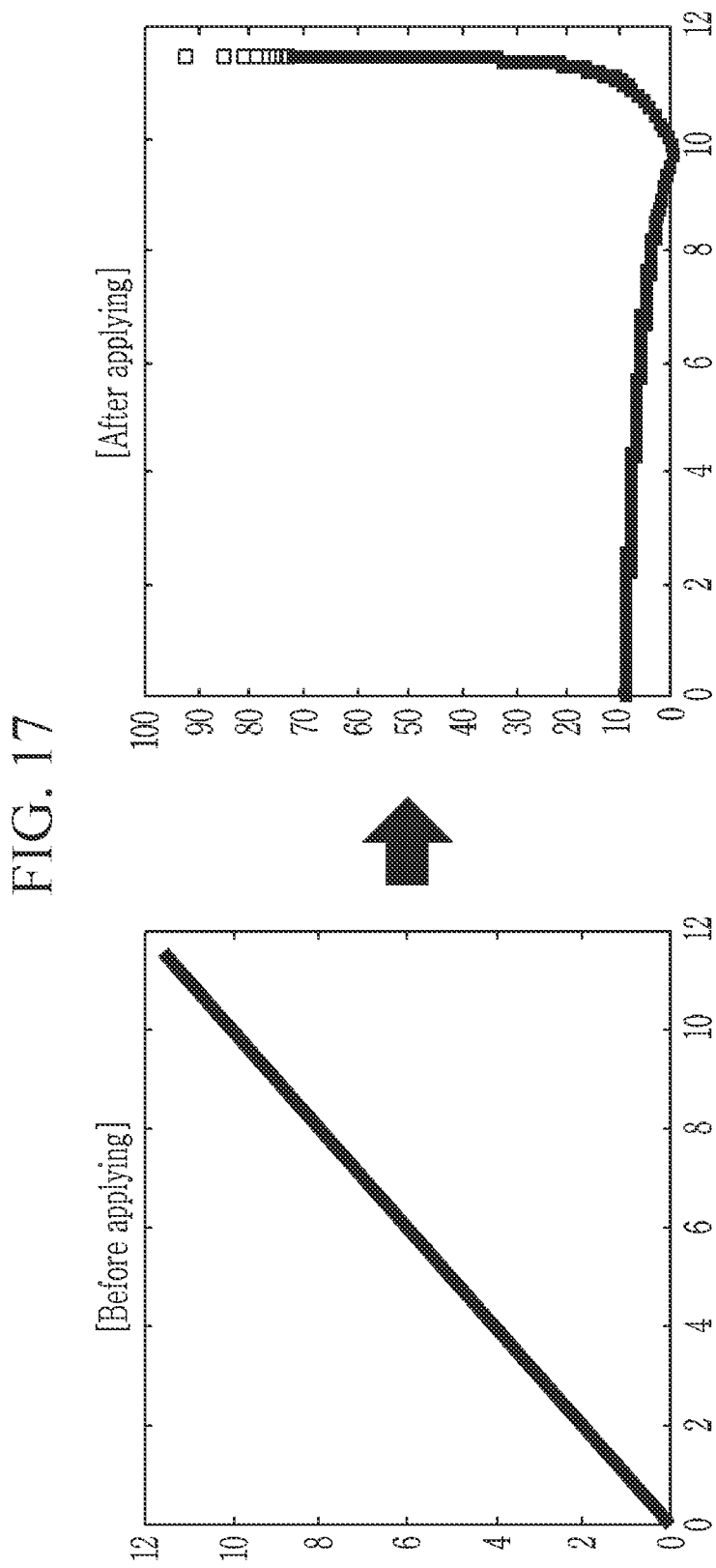
FIG. 17 is a diagram showing output values of the log function before and after applying of the apparatus for enhancing data sensitivity according to an embodiment of the present invention, respectively.

FIG. 17 is a diagram showing output values of the log function before and after applying the apparatus for enhancing data sensitivity according to an embodiment of the present invention, respectively. FIG. 18 is a diagram showing estimated dimension data of a dimension measurement model before and after applying of the apparatus for enhancing data sensitivity according to an embodiment of the present invention, respectively.

Referring to FIG. 17, when the apparatus for enhancing data sensitivity is not applied to the dimension measurement model, the values y of the log function for input data x are output. The input data x may be data values shown in FIG. 16.

Meanwhile, when the apparatus for enhancing data sensitivity is applied to the dimension measurement model, the input data x are output as the values y of the log function for the converted values z. That is, data x are converted to values z by the set objective function, and the converted values z are input to the log function. At this time, the objective function of Equation 3 with $c1=11.5$ and $\rho=100$ was used. In this case, it can be seen that the output values y of the log function changes greatly in the range of the objective value ($c1=11.5$) with respect to the data x shown in FIG. 16.

Figure 18:
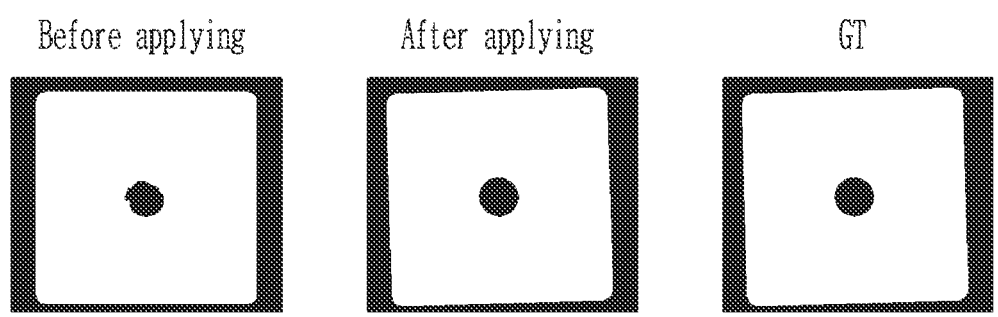
FIG. 18 is a diagram showing estimated dimension data of a dimension measurement model before and after applying of the apparatus for enhancing data sensitivity according to an embodiment of the present invention, respectively.

As a result, as shown in FIG. 18, when the apparatus for enhancing data sensitivity is not applied to the dimension measurement model, it can be seen that errors occur in the values inside a circle, which is information that is difficult to distinguish from the circular bottom surface. On the other hand, when the apparatus for enhancing data sensitivity is applied to the dimension measurement model, it can be seen that the values inside the circle where errors occur is almost the same as the GT data.

At least some functions of the method and apparatus for detecting a dimension error according to an embodiment of the present invention described above may be implemented by hardware or by software coupled to hardware. Hereinafter, an embodiment in which method and apparatus for detecting a dimension error are coupled to a computer system will be described in detail with reference to FIG. 19.

Figure 19:
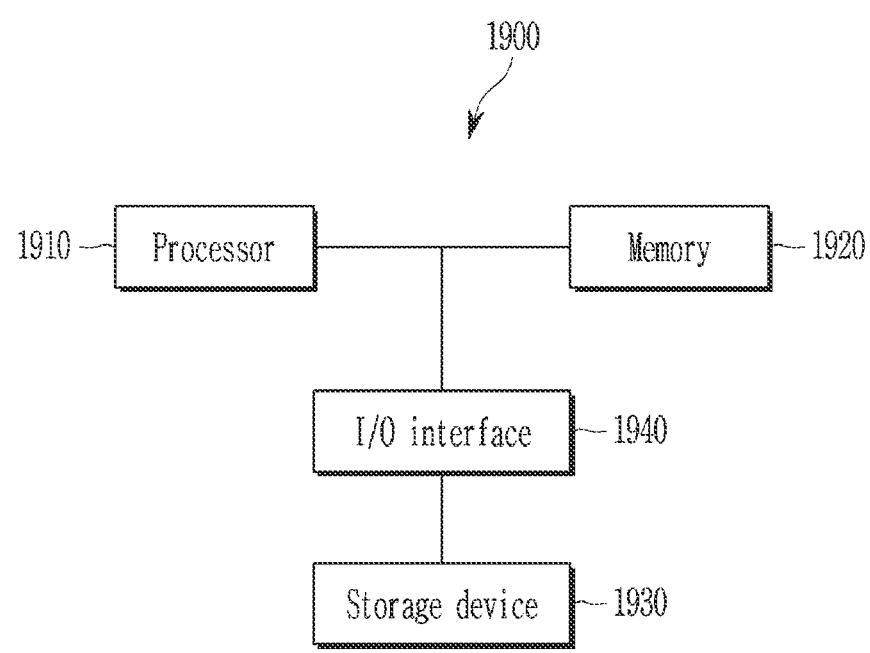
FIG. 19 is a schematic diagram of an apparatus for detecting a dimension error according to another embodiment of the present invention.

FIG. 19 is a schematic diagram of an apparatus for detecting a dimension error according to another embodiment of the present invention, and shows a system that can be used to perform at least some of the functions of the apparatus for detecting a dimension error described with reference to FIGS. 1 to 18.

Referring to FIG. 19, an apparatus for detecting a dimension error 1900 includes a processor 1910, a memory 1920, a storage device 1930, and an input/output (I/O) interface 1940.

The processor 1910 may be implemented as a central processing unit (CPU), another chipset, or a microprocessor.

The memory 1920 may be implemented as a medium such as random access memory (RAM), a dynamic random access memory (DRAM), a rambus DRAM (RDRAM), a synchronous DRAM (SDRAM), a static RAM (SRAM), etc.

The storage device 1930 may be implemented as a hard disk, an optical disk such as a compact disk read only memory (CD-ROM), a CD rewritable (CD-RW), a digital video disk ROM (DVD-ROM), a DVD-RAM, a DVD-RW disk, Blu-ray disks, etc., or a flash memory or permanent or volatile storage devices such as various types of RAM.

The memory 1920 or the storage device 1930 may store the above-described DBs.

The I/O interface 1940 allows the processor 1910 and/or the memory 1920 to access the storage device 1930. In addition, the I/O interface 1940 may provide an interface with a user. The processor 1910 may perform dimension measurement, dimension error detection, and data sensitivity enhancement functions described in FIGS. 1 to 18. The processor 1910 may load program commands for implementing at least some functions of dimension measurement, dimension error detection, and data sensitivity enhancement functions, and may control to perform the operations described with reference to FIGS. 1 to 18. These program commands may be stored in the storage device 1930, or may be stored in another system connected through a network.

Figure 20:
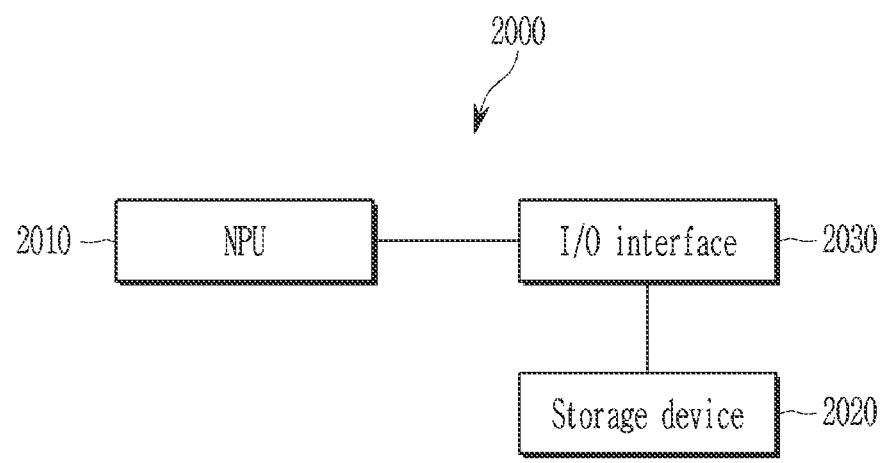
FIG. 20 is a schematic diagram of an apparatus for detecting a dimension error according to yet another embodiment of the present invention.

FIG. 20 is a schematic diagram of an apparatus for detecting a dimension error according to yet another embodiment of the present invention, and shows a system that can be used to perform at least some of the functions of the apparatus for detecting a dimension error described with reference to FIGS. 1 to 18.

Referring to FIG. 20, an apparatus for detecting a dimension error 2000 includes a neural processing unit (NPU) 2010, a storage device 2020, and an input/output (I/O) interface 2030.

A processor and a memory may be mounted on the NPU 2010 in a state optimized for dimension measurement and dimension error detection.

Since the description of the storage device 2020 and the I/O interface 2030 are the same as that described with reference to FIG. 19, a detailed description will be omitted. According to an embodiment of the present invention, it is possible to determine a dimension error of an object without user intervention, and expensive optical peripheral devices are not required. In addition, since it is possible to additionally obtain 3D information of an object, its application range is diverse.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method for detecting a dimension error of a target object in an apparatus for detecting a dimensional error, the method comprising:

obtaining an image of the target object;

estimating dimensional data for a region of interest (ROI) for which dimensions are to be measured from the image of the target object using a learned dimensional measurement model; and determining whether there is a dimension error in the ROI from the estimated dimension data using a learned dimension error determination model, wherein the method further comprising learning the dimension measurement model using learning data including an image of each analyzed object and ground truth (GT) dimension data of each analyzed object, wherein the learning includes:

converting the estimated dimension data of the dimension measurement model to the image of each analyzed object and the GT dimension data corresponding to the image of each analyzed object by using an objective function that converts data values within a set target value range, respectively;

calculating differences between the estimated dimension data and the ground truth dimension data converted, respectively, by the objective function; and updating weights set in the dimension measurement model based on the differences, wherein the learning further includes:

classifying the estimated dimension data of the dimension measurement model into data corresponding to the range of the target value and data outside the range of the target value;

substituting the data within the range of the target value and ground truth (GT) data as an input value of the objective function, respectively.

2. The method of claim 1, wherein the learning further includes:

in the case of data outside the range of the target value, calculating a difference between the data outside the range of the target value and the corresponding dimension data without conversion using the target function.

3. The method of claim 1, wherein the objective function includes a function of Equation 1, wherein Equation 1 is $z=\log(c1+1-x)$, and the $c1$ is the target value, and x is the estimated dimension data or the GT dimension data.

4. The method of claim 1, wherein the objective function includes a function of Equation 2, wherein Equation 2 is $z=\log(abs(\log(c1+1-x)))$, and the $c1$ is the target value, while x is the estimated dimension data or the GT dimension data.

5. The method of claim 1, further comprising:

learning the dimension measurement model using first learning data including an image of each analyzed object and GT dimension data of each analyzed object; and learning the dimension error determination model using second learning data including the image of each analyzed object, the estimated dimension data of the dimension measurement model for the image of each analyzed object, and information necessary for determining the dimension error of each analyzed object.

6. The method of claim 5, wherein the information necessary for determining the dimension error includes at least one of information on objects with a dimensional error, information on objects without a dimensional error, a shape of the region of interest; and a position of the ROI.

7. An apparatus for detecting a dimension error of a target object, the apparatus comprising:

an image capturing unit that acquires an image of the target object; and a dimension error analyzer that determines whether or not there is a dimension error in the region of interest for which dimensions are to be measured from the image of the target object using a learned dimension error determination model, wherein the apparatus further comprising a three-dimensional (3D) image acquirer that estimates dimension data for the ROI from the image of the target object using a learned dimension measurement model, wherein the dimension error determination model receives dimensional data estimated by the dimensional measurement model as an input and detects whether the dimension error has occurred, wherein the 3D image acquirer includes a dimensional measurement model learning unit that learns the dimension measurement model using learning data including an image of each analyzed object and ground truth (GT) dimension data of each analyzed object, and the dimension measurement model learning unit includes:

a data converter that converts the estimated dimension data of the dimension measurement model to the image of each analyzed object and the GT dimension data corresponding to the image of each analyzed object by using an objective function that converts data values within a set target value range, respectively; and a weight updater that updates weights set in the dimension measurement model based on differences between the estimated dimension data and the ground truth dimension data converted, respectively, by the objective function, wherein the dimension measurement model learning unit classifies the estimated dimension data of the dimension measurement model into data corresponding to the range of the target value and data outside the range of the target value and substitutes the data within the range of the target value and ground truth (GT) data as an input value of the objective function, respectively.

8. The method of claim 7, wherein the objective function includes a function of Equation 1 or Equation 2, wherein Equation 1 is $z=\log(c1+1-x)$, Equation 2 is $z=\log(abs(\log(c1+1-x)))$, and the $c1$ is the target value, while x is the estimated dimension data or the GT dimension data.

9. The apparatus of claim 7, further comprising, when a 2D image of the target object is acquired from the image capturing unit, a three-dimensional (3D) image acquirer that generates a depth image including distance information between the image capturing unit and the target object from the 2D image, wherein the dimension error analyzer determines whether the dimension error has occurred from the 2D image and the depth image of the target object using the dimension error determination model.

10. The apparatus of claim 9, wherein the dimension error analyzer includes a dimension error determination model learning unit that learns dimension error determination model using the 2D image of each object, a depth image generated from each 2D image, a 3D image of each object, dimension data corresponding to the 2D image for each object, and information necessary to determine the dimension error of each object.

11. The apparatus of claim 9, wherein the 3D image acquirer that generates the depth image from the 2D image of the target object through a learned depth estimation model.

12. The apparatus of claim 11, wherein the 3D image acquirer that learns a depth estimation model using the image of each object and the depth image including corresponding distance information of each 2D image.

* * * * *